3,435,626
PRESSURE CONTROL APPARATUS FOR
REFRIGERATION SYSTEM
Daniel D. Wile, Whittier, and David S. Brainard, Alhambra, Calif., assignors to Recold Corporation, Los Angeles, Calif., a corporation of California
Filed Feb. 7, 1966, Ser. No. 525,760
Int. Cl. F25b 41/04; F16k 31/145
U.S. Cl. 62—196          6 Claims

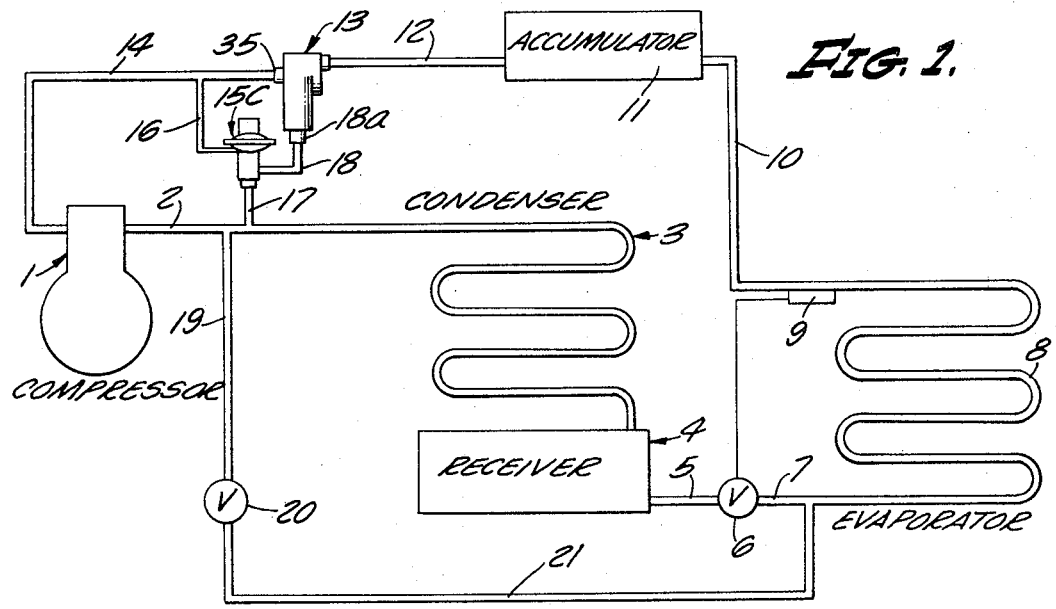
FIG. 1.
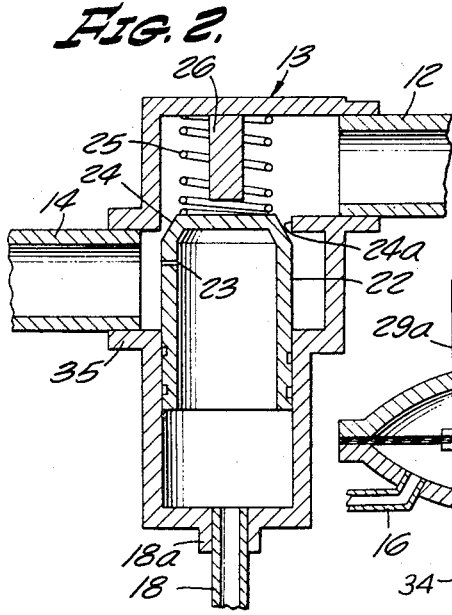
FIG. 2.
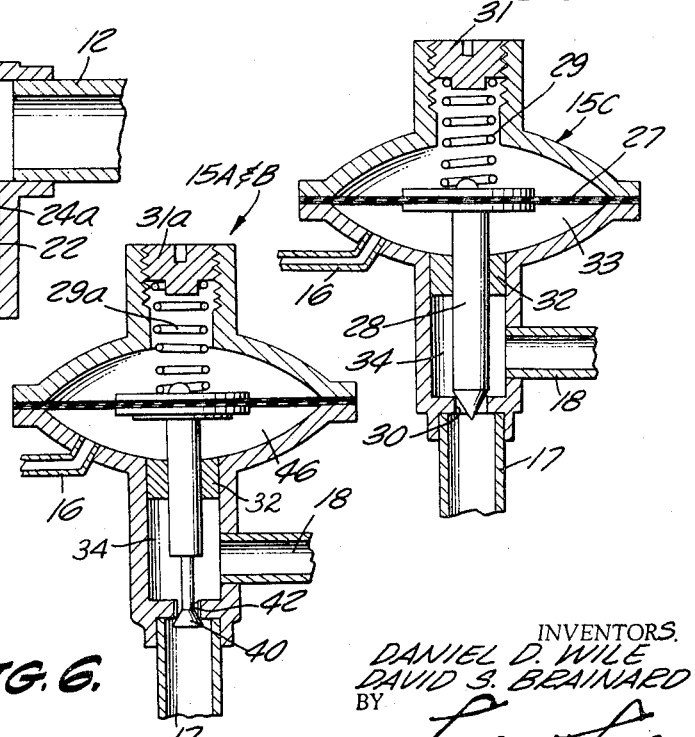
FIG. 3.
FIG. 6.
INVENTORS.
DANIEL D. WILE
DAVID S. BRAINARD
BY
Lyon & Lyon
ATTORNEYS INVENTORS.
DANIEL D. WILE
DAVID S. BRAINARD
BY
*Lyon & Lyon*
ATTORNEYS United States Patent Office 3,435,626
Patented Apr. 1, 1969

ABSTRACT OF THE DISCLOSURE

A control valve arrangement having a main control valve that is normally open and a pilot valve or valves that control the control valve to maintain desired operational pressures during the operation and defrost cycles of a refrigeration system.

This invention relates to pressure control apparatus and more particularly to a method and apparatus for the control of desired pressure conditions existing within a refrigeration or other similar fluid flow circuit.

In the operation of a refrigeration system of the closed recirculation type, it is desirable to control the pressure at the compressor to avoid over loading of the compressor motor. For example, if the pressure is too high the dsnsity of the gas is greater and more work is required to compress the same, also:

During defrosting it becomes particularly important to control the pressure at the compressor and also at the evaporator to insure condensation of the gas in the evaporator, and During normal refrigeration operation where one or more evaporators are used to maintain the evaporator pressure from falling too low and to avoid too low a temperature in the evaporator or evaporators.

The problems presented by the foregoing have long been recognized and pressure control apparatus has been provided seeking to overcome the said problems, but the prior attempts at solution of these problems have been through the use of valves which are either:

(1) Normally closed requiring some minimum pressure loss to hold the valve open, or, (2) Normally closed requiring high side pressure to open and which then tend to leak high side pressure to the low pressure side, particularly at the time when maximum capacity is desired.

In accordance with this invention, in order to overcome the problems and to control the pressure within said system, there is provided a control valve which is normally open during normal refrigeration operation and is controlled by one or more pilot valves dependent upon the pressure control desired.

In the maintenance of pressure control at the compressor the open control valve is pilot valve controlled by a normally closed pilot valve, the operation of which is dependent upon increase in pressure in the low pressure side as occurs, for example, during hot gas defrosting and in this occasion the unwanted pressure increase is used to open the pilot valve to close the control valve and restrict flow of refrigerant to the compressor, thereby maintaining the desired control of pressure at the compressor and also preventing overloading of the compressor motor. The same result would also be obtained at any other time when conditions occur which cause an unwanted pressure increase in the suction or low pressure side.

This invention also contemplates the control of the compressor line pressure during startup or other abnormal conditions of operation which would normally impose excessive high pressure on the compressor line.

In accordance with this invention, evaporator pressure is also controlled during the normal opeartion of the system. Such control of the evaporator pressure during normal refrigeration operation is desired when more than one evaporator is operating on the system and different temperatures may be desired for each of the evaporators. Furthermore, it may also be desired to control a single evaporator in the system in order to avoid unwanted low temperatures.

An alternate arrangement of the present invention consists of a pilot valve that opens with decreasing pressure in the evaporator low pressure line in a manner to close the main valve when the evaporating pressure drops to an unwanted lower pressure and thus prevents the evaporator pressure from becoming too low. Such control may be desired in a system with multiple evaporators operating at different temperatures or where a single evaporator is to be protected from going to an unwanted low pressure.

This type of system may also be utilized whereby the control valve remains closed until the evaporator reaches some desired higher pressure required for defrosting and then the control valve throttles to maintain this desired pressure in the evaporator.

The principal object of the present invention is to provide a control valve arrangement having a main valve that is normally open and a pilot valve that is normally closed, during the operation and defrost of the system under desired operational pressures.

Another object of the present invention is to provide a valve with minimum pressure drop when the pressures are satisfactory and also avoids leakage of high pressure into the lower pressure side when the low pressure side pressures are satisfactory.

A further object of the invention is to provide a control valve that is free from cycling or "hunting" and which is normally open and is controlled by a pilot valve.

A further object of the invention is to provide a control valve having a piston that engages with an orifice of approximately the same diameter as the piston by means of a tapered extension of the piston and which is operated by pressure on the piston as supplied by a pilot valve.

A still further object of the invention is to provide an apparatus which is normally open to flow during the refrigeration cycle and which regulates the pressure during the defrost cycle with minimum complication and expense.

Still another object of the invention is to provide an apparatus which controls the evaporator and/or compressor pressure throughout the entire operation of refrigerating and defrosting.

A still further object of the present invention is to provide an alternate system which may be utilized to control the minimum pressure in a refrigeration or similar system whereby the pilot valve opens when the pressure decreases in the evaporator and closes the main valve, thus preventing the evaporator pressure from becoming too low.

These and other objects and advantages of the invention will become apparent from the accompanying drawings, in which:

FIGURE 1 is a schematic diagram of a refrigeration system employing the apparatus of the present invention.

FIGURE 2 is a vertical cross-sectional view of valve 13.

FIGURE 3 is a cross-sectional view of pilot valve 15C.

FIGURE 6 is a cross-sectional view of pilot valves 15A and 15B used in the system shown in FIGURES 4, 5, and 7.

Figure 4:
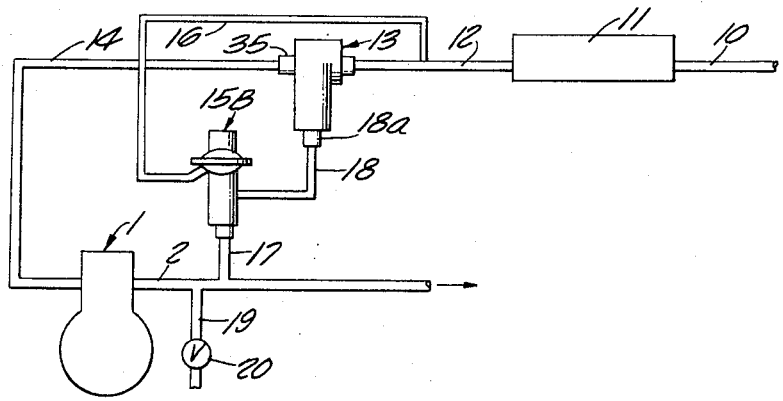
FIGURE 4 is a portional schematic diagram of a system employing the apparatus of the present invention.

In the embodiment of the invention of FIGURE 1 there is illustrated a schematic diagram of a refrigeration system consisting of a compressor and associated motor 1 connected by high pressure line 2 to a condenser 3, then to a receiver 4. Condensed refrigerant liquid from receiver 4 flows through pipe 5 to expansion valve 6 and then through pipe 7 to evaporator coil 8. Thermal bulb 9 of the expansion valve is located at the outlet of the evaporator of pipe 10 which leads into accumulator 11. Accumulator 11 is of the type described in Letters Patent No. 2,953,906, issued Sept. 27, 1960, to Lester K. Quick. Pipe 12 connects from accumulator 11 to valve 13, then through compressor low pressure line 14 and returns to compressor 1.

Valve 13 is controlled by a pilot valve 15C which receives pressure from high pressure line 2 through pipe 17. Pilot valve 15C is responsive to pressure variations in the compressor low pressure line 14 through pipe 16.

A hot gas bypass line 19 connects from high pressure line 2 through valve 20 to pipe 21 and then to pipe 7 at the inlet of the evaporator 8. Valve 20 may be a manually operated valve, conventional electric solenoid valve, or a similar apparatus.

FIGURE 2 is a detail of control valve 13 having an inlet connection for the pipe 12 and an outlet connection 35, with a control connection 18a. Piston 22 has a tapered portion 24 that engages with the orifice 24a. The piston 22 is normally held in an open position by a spring 25 or other suitable means. When the pressure is increased in the control connection 18a, the piston 22 moves to close off the orifice 24a and is restrained from moving too far by stop 26. 23 is a small orifice for venting the pressure into outlet connection 35.

FIGURE 3 is a detail of pilot valve 15C having a pressure inlet connection 17 and an outlet connection 18 and a pressure control connection 16. 27 is a diaphragm which operates a needle valve 28 into engagement with an orifice 30. The needle 28 is normally held in a closed position in relation to orifice 30 by means of a spring or other suitable means 29 and an adjusting screw 31. 32 is a pressure seal to separate the valve into two chambers, a pressure chamber 33 and a relief chamber 34.

Referring now to FIGURE 3, during the defrost operation, valve 20 (FIGURE 1) is open and bypasses warm high pressure refrigerant from the compressor discharge to the evaporator. This will cause a rise in pressure in the evaporator. Without means for limiting this pressure it may overload the compressor driving motor. To prevent this condition, it is desirable to have a restriction in the pipe connecting the evaporator to the compressor that acts only during the defrost operation. If the pressure in the pressure control connection 16 rises above a predetermined value, it will cause the diaphragm 27 to move against spring 29 and open orifice 30, permitting the flow of high pressure refrigerant from pipe 17 into a pipe 18.

Referring to FIGURE 2, a rise in pressure in pipe 18 causes piston 22 to move against spring 25 toward orifice 24a to restrict flow and prevent over-loading the compressor motor.

In the preferred embodiment of control valve 13, as shown in FIGURE 2, the valve has an orifice 24a of substantially the same diameter as piston 22 so that pressure in compressor low pressure line 14 has little or no reaction on the piston movement. The tapered portion 24 of piston 22 affords a gradual opening and closing of the valve. The relation of the piston diameter to the orifice diameter and the tapered seat, both individually and collectively, prevent oscillation or chattering of the piston 22 during the throttling operation. It will be understood that if a tight closing valve is desired, that orifice 24a may be made slightly smaller than piston 22. Furthermore, an orifice 23 may be positioned in the top or end portion of the piston 22 to communicate with pipe 12 rather than compressor low pressure line.

Referring to FIGURE 1, the arrangement shown therein limits the maximum pressure entering the compressor and thus prevents overloading the compressor motor during defrosting and also at any time the pressure in compressor low pressure line 14 becomes excessive, such as might occur during the starting up of a warm system.

Figure 5:
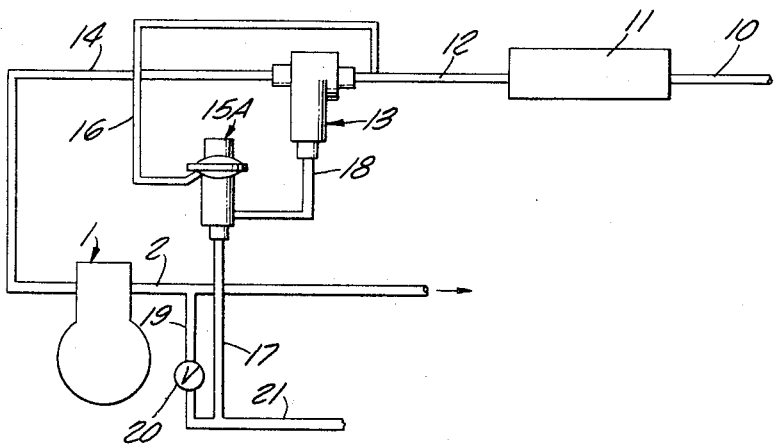
FIGURE 5 is a portional schematic diagram of a further system employing the apparatus of the present invention.

In the system as shown in FIGURE 5 the pipe 17 connects to the hot gas defrost line 21 instead of to the high pressure line 2. Since pipe 21 has high pressure only during the defrosting cycle, the valve will then restrict flow to the compressor only during the defrosting cycle.

Figure 7:
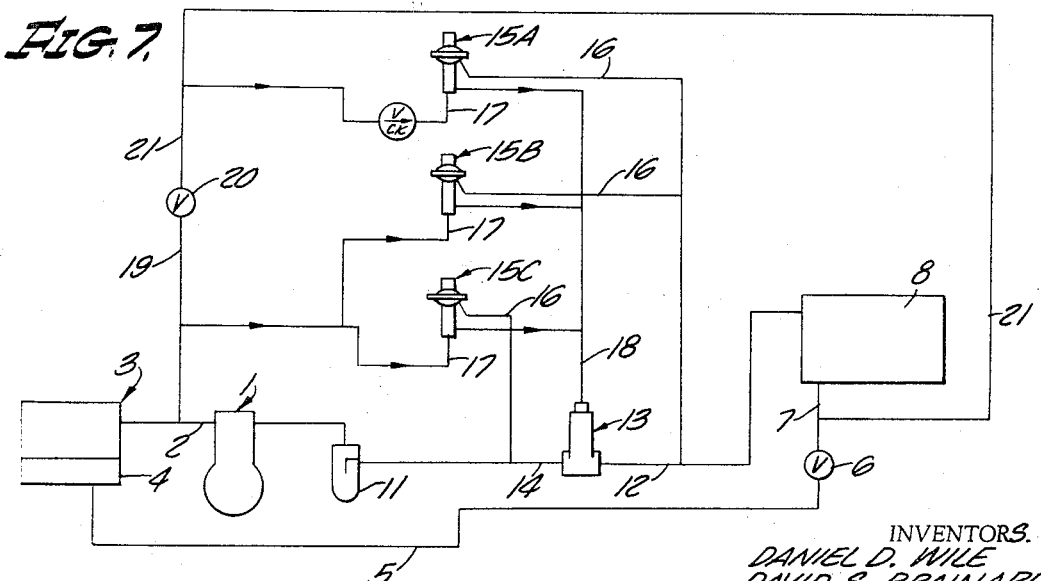
FIGURE 7 is a schematic diagram of a refrigeration system embodying our invention.

In FIGURE 6 we have shown the pilot valves 15A and 15B as diagrammatically included in FIGURE 7 and as used in the systems of FIGURES 4 and 5 and as employed to control the minimum pressure in the evaporator 8. In the pilot valves 15A and 15B the spring 29A urges the valves to open position. The valves are closed upon increasing pressure in the chamber 46, i.e., responsive to increased pressure in the suction line.

In FIGURE 7 we have shown the complete system incorporating each of the alternates or modifications heretofore defined with respect to FIGURES 1, 4, and 5, and wherein similar parts are numbered with similar letters. In this arrangement of FIGURE 7 a single main valve 13 and pilot valves 15A, 15B and 15C are connected to operate as shown and described in the separated systems of FIGURES 1, 4, and 5. Thus, in this single system there is provided:

Pilot valve 15C of FIGURE 3 opens on an increase in compressor suction pressure and in turn closes the main valve 13 preventing compressor overload (FIGURE 1);

Pilot valve 15B of FIGURE 6 opens on reduction in evaporator pressure and in turn closes the main valve 13, keeping the evaporator temperature from going too low and thus controlling the evaporator pressure (FIGURE 4);

Pilot valve 15A of FIGURE 6 opens on reduction in evaporator pressure and may be set to open at any appropriate pressure as, for example, approximately 70 pounds per square inch. The valve 15A is connected to the hot gas line 21 beyond the valve 20 so that during normal refrigeration it is in an open configuration (FIGURE 5). When the valve 20 is opened to initiate defrosting, valve 15A causes valve 13 to close. When the pressure in the evaporator reaches 70 pounds per square inch or such other selected pressure as may be desired, valve 15A closes and valve 13 opens to throttle liquid and gas from the evaporator.

Thus we have in the system of FIGURE 7 through the utilization of a single main control valve and three pilot valves control of the compressor suction pressure, evaporator pressure and defrost relief pressure.

While the preferred embodiments of the invention have been illustrated and described herein, it is to be understood that the invention may be used to regulate pressure in any system having a high and a low pressure side and the invention is not to be construed as limited to the specific details disclosed herein, except as included in the following claims.

We claim:
1. In a refrigeration system of the character described, including a compressor, a condenser, an expansion valve, an evaporator coil, means for controlling the refrigerator pressure in the compressor lower pressure line, comprising:

a pilot valve means and a contol valve means, said pilot valve means having an inlet connection interposed in the compressor high pressure line and an outlet connection, said control valve means having a control connection thereon, said control connection connected to said outlet connection on said pilot valve means, for controlling the opening and closing of said control valve means with the pressure from the high pressure line, a pressure control connection from said pilot valve means interposed and connected in the compressor low pressure line for sensing excessive pressure, the control valve means having its inlet and outlet connection interposed in said compressor low pressure line, said system operating to limit the maximum predetermined pressure in the compressor low pressure line at said pressure control connection by the pilot valve means operating upon a pressure increase to modulate the control valve means between the open and closed position by the suction induced by the compressor to reduce the pressure at said low pressure control connection.

2. In a refrigeration system of the character described including serially connected, a compressor, a condenser, an expansion valve and evaporating coil, means for controlling the refrigerant pressure in the compressor lower pressure line comprising:

a pilot valve means and a control valve means in which the pilot valve means has an inlet connection interposed in the compressor high pressure line, an outlet connection connected to the control connection of said control valve means and a connection for controlling the operation of said control valve means interposed in said compressor low pressure line, a relief chamber in said pilot valve means interposed between said inlet and outlet connection, a diaphragm operated needle valve therein, said diaphragm and needle valve being adjustable by an adjusting means and maintained in a normally closed engagement with an orifice in said inlet connection by a closing means, a pressure seal dividing said valve into a pressure chamber adjacent to said relief chamber, a pressure control connection from said control valve means connected to said pressure control chamber to operate said control valve means and limit the maximum predetermined pressure in the compressor low pressure line at said pressure control connection by the pilot valve means operating upon a pressure increase to modulate the control valve means between the open and closed positions by the suction induced by the compressor to reduce the pressure in said line pressure control connection.

3. In a refrigeration system of the character described, including a compressor and an evaporator connected serially and having a high pressure line connecting the compressor and the evaporator and a low pressure line connecting the evaporator and the compressor, the control system including a pressure operated control valve means positioned in the low pressure line and a pressure responsive pilot valve means for actuating the control valve means, the pilot valve means being connected within the low pressure line and being responsive to pressure therein and being connected to the high pressure line to control the application of high pressure line pressure upon the control valve means to regulate the minimum pressure maintained in the system when the pilot valve means closes upon an actuating pressure decrease which operates to open the control valve means, the pilot valve means comprising an inlet connection and an outlet connection, a relief chamber interposed therebetween, a diaphragm operated needle valve therein, said diaphragm and needle valve being adjustable by an adjusting means and maintained in a normally open configuration within an orifice in said inlet connection by an opening means, a pressure seal dividing said control valve means into a pressure chamber adjacent to said relief chamber, a pressure control connection entering said pressure control chamber from the compressor low pressure line, said system operating in conjunction with a normally open control valve means to regulate the minimum pressure maintained in the system, by said pilot valve means closing upon a pressure decrease and said control valve means opening.

4. The refrigeration system of claim 3 wherein said system having provisions for hot gas defrosting of the evaporator coils, and the pressure inlet connection of said pilot valve means is interposed in high pressure line coming directly from the compressor to modulate the flow of refrigerant returning to the compressor during the defrost cycle.

5. The refrigeration system of claim 3 wherein the line regulating said pilot valve is interposed in the compressor low pressure line ahead of said control valve means to limit the maximum pressure entering the compressor during defrosting.

6. In a refrigeration system of the character described including a compresor, a condenser, an expansion valve, an evaporator coil, a hot gas defrost system and associated accumulator, means for controlling the refrigerant pressure returning to the compressor during the refrigeration and defrost cycles comprising:

a control valve means interposed in the line returning from said evaporator to the low pressure side of said compressor;

said control valve means alternately modulated by one of three pilot valve means;

one of said pilot valve means interposed in said refrigeration system to open on a reduction of evaporator pressure and in turn close said control valve means to control the evaporator pressure;

the second of said pilot valve means interposed in said refrigeration system opening on an increase in the compressor suction pressure which in turn closes said control valve means to prevent overloading of said compressor;

the third of said pilot valve means interposed in said refrigeration system to open on a reduction of the evaporator pressure below a predetermined minimum pressure to maintain a constant predetermined pressure in said evaporator, said third valve means closing when the defrost-cycle is initiated to open said control valve means and throttle liquid and gas from the evaporator to said compressor.

References Cited

UNITED STATES PATENTS

| 1,220,823 | 3/1917 | Burke | 251—61.2 |
| 1,510,161 | 9/1924 | Raymond | 251—28 |
| 2,002,450 | 5/1935 | George | 251—63 |
| 2,264,385 | 12/1941 | Knox | 62—217 XR |
| 2,661,023 | 12/1953 | Griswold | 251—61.2 |
| 3,303,664 | 2/1967 | Hansen | 62—217 |
| 2,161,312 | 6/1939 | Pritchard | 62—217 XR |
| 2,766,593 | 10/1956 | Mitchell | 62—217 |

MEYER PERLIN, *Primary Examiner.*

U.S. Cl. X. R.

62—217; 251—28

UNITED STATES PATENT OFFICE
CERTIFICATE OF CORRECTION

Patent No. 3,435,626                                    April 1, 1969

Daniel D. Wile et al.

It is certified that error appears in the above identified patent and that said Letters Patent are hereby corrected as shown below:

In the heading to the printed specification, lines 4 and 5, "Recold Corporation, Los Angeles, Calif., a corporation of California" should read -- Borg-Warner Corporation, Chicago, Ill., a corporation of Illinois --.

Signed and sealed this 7th day of April 1970.

(SEAL)
Attest:

Edward M. Fletcher, Jr.

Attesting Officer

WILLIAM E. SCHUYLER, JR.
Commissioner of Patents